United States Patent
Wilcox

[11] 3,891,706
[45] June 24, 1975

[54] 2-AMINO-2,6-DINITROPHENYLHYDRAZINES

[76] Inventor: Merrill Wilcox, 2911 N.W. 30th Ter., Gainesville, Fla. 32601

[22] Filed: Oct. 2, 1972

[21] Appl. No.: 294,147

[52] U.S. Cl. ...... 260/569; 260/239 B; 260/247.2 B; 260/247.5 R; 260/268 N; 260/293.72; 260/293.74; 260/293.75; 260/293.79; 260/469; 260/471 C; 260/518 A; 71/121; 424/330
[51] Int. Cl. .......................................... C07c 109/04
[58] Field of Search ........ 260/569; 424/330; 71/121

[56] References Cited
UNITED STATES PATENTS
3,745,215   7/1973   Kangars .......................... 260/569 X

*Primary Examiner*—R. V. Hines
*Attorney, Agent, or Firm*—Harry Falber; Frederick H. Rabin; Philip P. Berestecki

[57] ABSTRACT

3-amino-2,6-dinitrophenylhydrazines of the formula

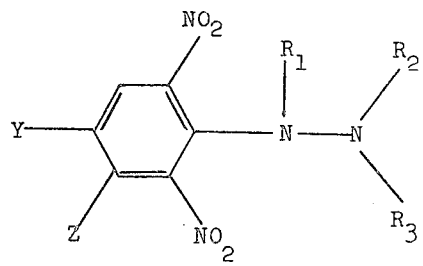

wherein Y is halogen, haloalkyl carbamyl, lower alkyl substituted carbamyl, carboxyl, lower alkoxy carbonyl, trifluoromethyl, nitro or cyano; Z is amino which is optionally substituted with lower alkyl, lower alkoxy, substituted lower alkyl, substituted lower alkoxy or mono or di-lower alkylamino, with the proviso that not more than one of the substituents is alkoxy, substituted alkoxy or mono or di-lower alkylamino; $R_1$ is H, lower alkyl or lower alkenyl, said alkyl and alkenyl groups are optionally substituted with halogen, lower alkoxy, phenyl or cycloalkyl; $R_2$ and $R_3$ are independently H, $C_1$-$C_5$ alkyl, $C_2$-$C_5$ alkenyl, said alkyl and alkenyl groups are optionally substituted with cycloalkyl groups; $R_2$ and $R_3$ can also be taken together with the nitrogen atom to which they are linked forming the ring structures piperidino, hexamethylenimino, morpholino, or 4-methylpiperazino.

These compounds are very active plant growth regulators and are particularly useful as herbicides and in tobacco sucker control.

10 Claims, No Drawings

2-AMINO-2,6-DINITROPHENYLHYDRAZINES

DESCRIPTION OF THE INVENTION

The present invention concerns 3-amino-2,6-dinitrophenylhydrazines, methods for regulating plant growth with said compounds, and compositions containing said compounds as active substances. The compounds of the present invention are particularly useful as herbicides and agents for the control of tobacco suckers.

More particularly, the invention concerns 3-amino-2,6-dinitrophenylhydrazines of the formula

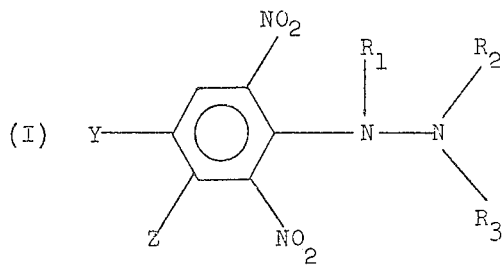

wherein Y is halogen (preferably Cl or Br), haloalkyl trifluoromethyl, carbamyl, lower alkyl substituted carbamyl, carboxyl, lower alkoxycarbonyl, nitro or cyano; Z is amino which is optionally substituted with lower alkyl, lower alkoxy, substituted lower alkyl, substituted lower alkoxy or mono or di-lower alkylamino with the proviso that not more than one of the substituents is alkoxy, substituted alkoxy or mono or dilower alkylamino; $R_1$ is hydrogen, lower alkyl or lower alkenyl, said alkyl and alkenyl groups are optionally substituted with halogen (preferably Cl or Br), lower alkoxy, phenyl or cycloalkyl (preferably $C_3$-$C_6$ cycloalkyl); $R_1$ is preferably H; $R_2$ and $R_3$ are independently H, $C_1$-$C_5$ alkyl (preferably $C_1$-$C_3$ alkyl), $C_1$-$C_5$ alkoxy (preferably $C_1$-$C_3$ alkoxy), lower alkoxyalkyl, or $C_2$-$C_5$ alkenyl (preferably $C_2$-$C_3$ alkenyl), said alkyl, alkoxy, alkenyl, and alkoxyalkyl groups are optionally substituted with cycloalkyl groups (preferably $C_3$-$C_6$ cycloalkyls); $R_2$ and $R_3$ can also be taken together with the nitrogen atom to which they are linked forming the ring structures piperidino, hexamethyleneimino, morpholino, or 4-methylpiperazino.

Especially useful are those compounds within the scope of formula (I) which have the formula

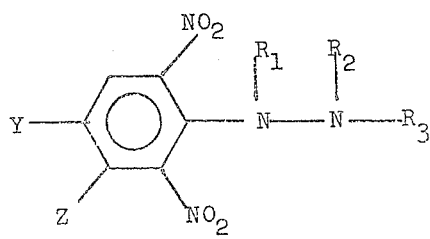

wherein Y is chloro, trifluoromethyl, nitro or cyano; Z is amino or amino substituted with $C_1$-$C_4$ alkyl or alkoxy with the proviso that not more than one of the substituents is alkoxy; $R_1$ is $C_1$-$C_4$ alkyl or H; $R_2$ and $R_3$ are independently H, $C_1$-$C_3$ alkyl; $R_2$ and $R_3$ are taken together with the nitrogen atom to form piperidino.

Particularly preferred compounds have the formula

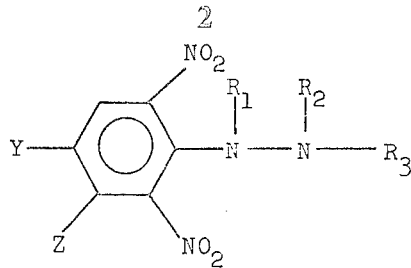

wherein Y is chloro, trifluoromethyl, nitro or cyano; Z is amino; $R_1$ is H; $R_2$ and $R_3$ are independently $C_1$-$C_3$ alkyl.

The following compounds are particularly useful in this invention: 2-(3-amino-2,6-dinitro-4-trifluoromethylphenyl)-1,1-dimethylhydrazine, 2-(3-amino-2,6-dinitro-4trifluoromethylphenyl)-1,1-diethylhydrazine, 2-(3-amino-4-chloro-2,6-dinitrophenyl)-1,1-diethylhydrazine, and 2-(3-amino-4-chloro-2,6-dinitrophenyl-1,1-dimethylhydrazine.

The following compounds are particularly useful in tobacco sucker control: 2-(3-amino-2,6-dinitro-4-trifluoromethylphenyl)-1,1-dethylhydrazine, 2-(3-amino-2,6-dinitro-4-trifluoromethylphenyl)-1,1-dimethylhydrazine, 2-(3-amino-2,6-dinitro-4-chlorophenyl)-1,1-diethylhydrazine, and 2-(3-amino-2,6-dinitro-4-chlorophenyl)-1,1-dimethylhydrazine.

The herbicidal compounds of the present invention can of course be formulated and applied in accordance with a wide variety of conventional agronomic techniques. Conveniently herbicidal formulations are prepared containing about 2 – 90% by weight active ingredients and are applied at a rate of about 0.5 – 30 lbs. per acre. When the compounds of the present invention are used for tobacco sucker control they are preferably applied at a rate of about 10 to about 400 milligrams per plant.

Compounds of formula (I) can be prepared by reacting substantially equimolar amounts of a 2-nitro-1,3-di= chlorobenzene of formula (II)

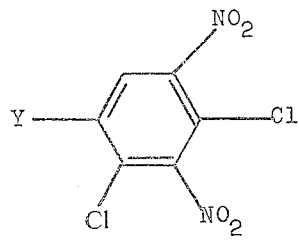

with a hydrazine of formula (III)

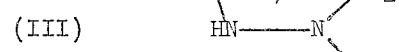

in the presence of an acid acceptor such as an alkylamine of formula (IV)

(IV) 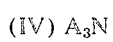

In these structures, Y, Z, $R_1$, $R_2$, and $R_3$ have the meanings ascribed to them in formula (I), and A represents lower alkyl. These reactants are dissolved in a suitable aprotic solvent, such as tetrahydrofuran, a dioxane, or low molecular weight ethers. A precipitate of trialkylamine hydrochloride appears and is filtered off. The supernatant is then subjected to a similar reaction with ZH and A₃N (both of which may be simply NH₃) to yield the 3-amino-2,6-dinitrophenylhydrazine of formula (I). If ZH equals R₂R₃NR,NH, the two steps may be simultaneous.

The starting materials are readily available or can be prepared by methods well-known in the art. Thus, compounds of formula (II) may be prepared by nitration of an appropriate chlorobenzene or replacement of the —OH group of a nitrophenol by a chlorine atom. Details concerning the preparation of representative examples of those compounds may be found in Bunnet, et al., J.A.C.S. 76, 3936-39 (1954), Friedrich, et al., U.S. Pat. No. 2,257,093 (Sept. 30, 1944), Soper U.S. Pat. No. 3,442,639 (May 6, 1969), U.S. Pat. No. 3,586,725 to Hunter.

The hydrazines of formula (III) are either commercially available or may be prepared by amination of dialkylamines with chloramine or hydroxylamine-O-sulfonic acid or catalyzed ammonia or by reduction of dialkylnitrosamines.

The trialkylamine of formula (IV) functions as an acid acceptor. In lieu thereof, other compounds which will form an insoluble salt in the reaction may be used. These compounds include pyridines and alkylpyridines, alkali metal hydroxides, excess substituted hydrazine, or other acid acceptors well-known in the art. It is advantageous to use excess hydrazine as the acid acceptor, since the resulting hydrazine hydrochloride may be treated with an inorganic base, thus recovering the substituted hydrazine.

The 3-amino-2,6-dinitrophenylhydrazines of formula I, mixed together with the usual additives, are used as herbicidal agents. Furthermore, the active substances can be mixed with fertilizers and applied in this form. The range of activity of the compounds of the invention can be widened by applying them in admixture with other herbicides, e.g., with triazines such as halogen-diamino-s-triazines, alkoxy- and alkylthiodiamino-s-triazines, diazines such as uracils, pyridazines, phenols, aliphatic carboxylic acids and halogen carboxylic acids, halogenated benzoic acids and halogenated phenylacetic acids, aryloxyalkane carboxylic acids and aryloxyalkane sulfonic acids, pyridine caroxylic acids, amides, thioamides, hydrazides, esters and nitriles of similar carboxylic acids, carbamic acid esters and thiocarbamic acid esters, quaternary ammonium compounds, ureas, inorganic salts, etc., especially with:

2-chloro-4,6-bis-(ethylamino)-s-triazine
2-chloro-4-ethylamino-6-isopropylamino-s-triazine
2-chloro-4,6-bis-(methoxypropylamino)-s-triazine
2-methoxy-4,6-bis-(isopropylamino)-s-triazine
2-methylthio-4-methoxypropylamino-isopropylamino-s-triazine
2-methylthio-4,6-bis-(isopropylamino)-s-triazine
2-methylthio-4,6-bis-(ethylamino)-s-triazine
2-methylthio-4-ethylamino-6-isopropylamine-s-triazine
2-methoxy-4,6-bis-(ethylamino)-s-triazine
2-methoxy-4-ethylamino-6-isopropylamino-s-triazine
2-chloro-4,6-bis-(isopropylamino)-s-triazine
5-bromo-3-sec.butyl-6-methyl-uracil
3-cyclohexyl-5,6-trimethylene-uracil
5-amino-5-chloro-1-phenyl-pyridazone-(6)
3,6-dioxo-1,2,3,6-tetrahydropyridazine
dinitro-sec.butylphenol and salts thereof
pentachlorophenol and salts thereof
trichloracetic acid and salts thereof
2,2-dichloropropionic acid and salts thereof
2-chloro-N,N-diallylacetic acid amide
N-(3',4'-dichlorophenyl)-cyclopropane carboxylic acid amide maleic acid hydrazide
2,3,6-trichlorobenzoic acid and salts thereof
2,3,5,6-tetrachlorobenzoic acid and salts thereof
2-methoxy-3,5,6-trichlorobenzoic acid and salts thereof
2-methoxy-3,6-dichlorobenzoic acid and salts thereof
3-amino-2,5-dichlorobenzoic acid and salts thereof
3-nitro-2,5-dichlorobenzoic acid and salts thereof
2-methyl-3,5-dichlorobenzoic acid and salts thereof
2-methyl-3,5-dichlorobenzoic acid and salts thereof
2,6-dichlorobenzonitrile
2,6-dichloro-thiobenzamide
2,3,6-trichlorophenyl acetic acid and salts thereof
2,4-dichlorophenoxyacetic acid and salts thereof
2,4,5-trichlorophenoxyacetic acid and salts and esters thereof
(2-methyl-4-chlorophenoxy)-acetic acid and salts and esters thereof
2-(2',4',5'-trichlorophenoxy)-propionic acid and salts and esters thereof
2-(2',4',5'-trichlorophenoxy)-ethyl-2,2-dichloropripionate
4-2',4'-dichlorophenoxy)-butyric acid and salts and esters thereof
4-(2'-methyl-4'-chlorophenoxy)-butyric acid and salts and esters thereof
2,3,6-trichlorobenzyloxypropanol
4-amino-3,5,6-trichloropicolinic acid
N'-cyclooctyl-N,N-dimethyl urea 3-phenyl-1,1-dimethyl urea
3-(4'-chlorophenyl)-1,1-dimethyl urea
3-(3'-trifluoromethylphenyl)-1,1-dimethyl urea
3-(3',4'-dichlorophenyl)-1,1-dimethyl urea
3-(3',4'-dichlorophenyl)-1-n-butyl-1-methyl urea
3-(3',4'-dichlorophenyl)-1,1,3-trimethyl urea
3-(3'4'-dichlorophenyl)-1,1-diethyl urea
3-(4'-chlorophenyl)-1-methoxy-1-methyl urea
3-(3',4'-dichlorophenyl)-1-methoxy-1-methyl urea
3-(4'-bromophenyl)-methoxy-1-methyl urea
3-(3',4'-dichlorophenyl)-3-methoxy-1,1-dimethyl urea
3-(4'-chlorophenoxyphenyl)-1,1-dimethyl urea
N,N-di-(n-propyl)-S-ethyl-thiolcarbamic acid ester
N,N-di-(n-propyl)-S-n-propyl-thiolcarbamic acid ester
N-ethyl-N-(n-butyl)-S-n-propyl-thiolcarbamic acid ester
N-phenyl-O-isopropyl-carbamic acid ester
N-(m-chlorophenyl)-O-isopropyl-carbamic acid ester
N-(m-chlorophenyl)-O-(4'chloro-2'-butinyl)-carbamic acid ester
N-(3',4'-dichlorophenyl)-O-methyl-carbamic acid ester.

The subject herbicides have utility in that they control tobacco suckers very well, are highly soluble in many organic solvents and are particularly effective as herbicides against a variety of grasses and solanacious weeds such as for example weeds of the genera Digitaria, Echinochloa, Setaria, Solanum, Datura, Physalis. See also, other weeds described by Q. F. Soper, U.S. Pat. No. 3,257,190.

The production of herbicidal compositions according to the invention is carried out in a manner well-known in the art by the intimate mixing and grinding of the active substances of the general formula I with suitable carriers, optionally with the addition of dispersing agents or solvents which are inert to the active substances. The active substances can exist and be used in the following forms:

as solids: dusts, sprinkling agents, granulates, coated granules, impregnated granules and homogeneous granules;
as concentrates of active substances dispersible in water: wettable power, pastes, emulsions;
as liquids: solutions, aerosols.

To produce the solid forms (dusts, sprinkling agents, granulates), the active substances are mixed with solid carriers. Suitable carriers are, e.g., kaolin, talcum, bole, chalk, limestone, ground limestone, dolomite, diatomaceous earth, precipitated silicic acid, alkaline earth silicates, sodium and potassium aluminum silicates (feldspar and mica), calcium and magnesium sulfates, magnesium oxide, ground synthetic plastics, fertilizers such as ammonium sulfate, ammonium phosphate, ammonium nitrate, ureas, ground vegetable products such as grain flour, bark flour, sawdust, ground nut shells, cellulose powder, residues of plant extractions, activated charcoal, etc.. These carriers can be used separately or they can be mixed with each other.

The grain size of the carriers is, for dusts, advantageously up to ca. 0.1 mm, for sprinkling agents it is ca. 0.075 to 0.2 mm and for granulates 0.2 mm upwards.

The concentrations of active substances in the solid preparations are, as a rule, 0.5 to 80% of the total weight.

To these mixtures can also be added additives which stabilize the active substance and/or non-ionic, anion-active and cation-active substances, which, for example, improve the adhesion of the active substances on plants and parts of plants (glues and adhesives) and/or ensure a better wettability (wetting agents) and also dispersibility (dispersing agents). The following are examples of adhesives: olein-chalk mixtures, cellulose derivatives (methyl cellulose, carboxymethyl cellulose), hydroxyethyl glycol ethers of mono- and di-alkyl phenols having 5 to 15 ethylene oxide radicals per molecule and 8 or 9 carbon atoms in the alkyl radical, lignin sulfonic acids, their alkali and alkaline earth metal salts, polyethylene glycol ethers, fatty alcohol polyethylene glycol ethers having 5 to 20 ethylene oxide radicals per molecule and 8 to 18 carbon atoms in the fatty alcohol part, condensation products of ethylene oxide, propylene oxide, polyvinyl pyrrolidones, polyvinyl alcohols, condensation products of urea/formaldehyde as well as Latex products.

Concentrates of active substances which can be dispersed in water (wettable powders), pastes and emulsion concentrates, are agents which can be diluted with water to give any desired concentration. They consist of active substances, carriers, optionally additives which stabilize the active substance, surface agent substances and antifoaming agents and, optionally, solvents. The concentration of active substance in these agents is 5 to 80% of the total weight of the latter.

The wettable powders and pastes are obtained by mixing and grinding the active substances with dispersing agents and pulverulent carriers in suitable devices until homogeneity is attained. Suitable carriers are, for example, those previously mentioned for solid preparations. It is advantageous in some cases to use mixtures of different carriers. Suitable dispersing agents are, e.g., condensation products of sulfonated naphthalene and sulfonated naphthalene derivatives with formaldehyde, condensation products of naphthalene or of naphthalene sulfonic acids wtih phenol and formaldehyde, also alkali, ammonium and alkaline earth metal salts of lignin sulfonic acid, also alkylaryl sulfonates, alkali and alkaline earth metal salts of dibutyl naphthalene sulfonic acid, fatty alcohol sulfates such as salts of sulfated fatty alcohol glycol ethers, the sodium salt of oleyl ethionate, the sodium salt of oleyl methyl tauride, ditertiary acetylene glycols, dialkyldilauryl ammonium chloride and fatty acid alkali and alkaline earth metal salts.

Examples of anti-foaming agents are: silicones, etc. The active substances are so mixed, ground, sieved and strained with the above-mentioned additives that the solid particle size in wettable powders does not exceed 0.02 – 0.04 mm and, in the case of pastes, 0.003 mm. To produce emulsion concentrates and pastes, dispersing agents such as those states in the previous sections, organic solvents and water are used. Examples of solvents are: alchols, benzene, xylenes, toluene, dimethyl sulfoxide and mineral oil fractions boiling between 120° and 350°C. The solvents must be practically without smell, not phytotoxic, inert to the active substances and not easily flammable.

In addition, the agents according to the invention can be used in the form of solutions. For this application, the active substance or substances of the general formula I are dissolved in suitable organic solvents, mixtures of solvents or in water. Aliphatic and aromatic hydrocarbons, chlorinated derivatives thereof, alkyl naphthalenes, mineral oils, on their own or mixed with each other, can be used as organic solvents. The solvents should contain the active substances within a concentration range of 1 to 20% calculated on the total weight of the resulting solution.

Other biocidal active substances or agents can be mixed with the described compositions according to the invention. Thus, in addition to the stated compounds of the general formual I and other herbicides, the new agents can also contain, e.g., insecticides, fungicides, bactericides, fungistatics, bacteriostatics or nematocides in order to widen the range of action. The compositions according to the invention can also contain fertilizers, micronutrients, etc.

Forms of preparation of these active substances are described in the following. Where not otherwise expressly stated, the terms "parts" and "percentage" are given by weight.

Wettable Power

The following constituents are used to produce a) a 10% wettable powder, and
b) a 25% wettable powder:
a) 10 parts of 2-(3-amino-2,6-dinitro-4-trifluoromethylphenyl)-1,1-diethylhydrazine.
10 parts of lignin sulfonic acid calcium salt
2 parts of adhesive consisting of 50% polyvinylpyrrolidone and 50% Champagne chalk

| | |
|---|---|
| 38 | parts of kaolin |
| 40 | parts of Champagne chalk |
| b) 25 | parts of 2-(3-amino-2,6-dinitro-4-trifluoromethylphenyl)-1,1-dimethylhydrazine |
| 5 | parts of condensation products of naphthalene sulfonic acid, phenol sulfonic acids and formaldehyde in the ratio 3:2:0.5 |
| 4 | parts of dibutyl naphthyl sulfonate sodium salt |
| 1 | part of methyl-oleyl-tauride sodium salt |
| 15 | parts of silicic acid |
| 25 | parts of neutral sodium aluminum silicate |
| 25 | parts of kaolin |

The stated active substances are coated onto the corresponding carriers (kaolin and chalk) and then mixed and ground with the listed additives. A wettable powder is obtained having excellent wettability and suspension properties. Suspensions of any desired active substance concentration can be prepared from this wettable powder by diluting with water.

Emulsion Concentrate

The following constituents are mixed together to produce a 25% emulsion concentrate:

| | |
|---|---|
| 25 | parts of 2-(3-amino-4-chloro-2,6-dinitrophenyl)-1,1-diethylhydrazine |
| 35 | parts of methylethylketone |
| 30 | parts of xylol and |
| 10 | parts of isooctylphenyl polyethylene glycol |

This concentrate can be diluted with water to obtain emulsions of suitable concentrations. Such emulsions are suitable for controlling weeds in cultivated plantations, for which purpose application of amounts of about 0.5 to 4 lbs. of a compound of formula (I) per acre of treated soil is recommended.

The following examples are intended to illustrate some of the embodiments of the present invention. The examples therefore are for illustrative purposes only and are not to be construed as limitations.

EXAMPLE 1

Under a nitrogen atmosphere, 4.5 gms. 2,4-dichloro-3,5-dinitrobenzotrifluoride were dissolved in 70 ml. tetrahydrofuran. The solution was cooled to −14°C. A solution of 1.6 gms. triethylamine and 1.4 gms. 1,1-diethylhydrazine in 15 ml. tetrahydrofuran was added slowly, so that the temperature did not rise above −10°C. The bottle containing the reaction mixture was capped tightly, the while maintaining a nitrogen atmosphere. The reactants were then allowed to come to ambient temperature during 8 hrs. and remain thusly for 3 days. The solution was then filtered to remove the triethylamine hydrochloride precipitate and put into a stainless steel reaction vessel, purged with nitrogen gas, and cooled to −20°C. An excess of liquid anhydrous ammonia was then run into the reaction vessel. The temperature was maintained at −20°C for 24 hrs. The vessel was vented and allowed to rise to room temperature. The contents were reduced in volume until there was a noticeable increase in viscosity, at which point 60-90 petroleum ether was used to precipitate crude 2-(3-amino-2,6-dinitro-4-trifluoromethylphenyl)-1,1-diethylhydrazine, m.p. 99°–105°C. Recrystallization from ethyl ether and ligroine gave m.p. 102°–105°C.

EXAMPLE 2

Into 80 ml. tetrahydrofuran under a nitrogen atmosphere were dissolved 4.5 gms. 2,4-dichloro-3,5-dinitrobenzotrifluoride. The solution was cooled to −14°C. A solution of 3.2 gms. triethylamine and 2.8 gms. 1,1-diethylhydrazine in 30 ml. tetrahydrofuran was added at such a rate that the temperature did not rise past −10°C. While continuing to maintain the nitrogen atmosphere, the bottle containing the reaction mixture was capped tightly and allowed to come to room temperature during a period of 4 hrs. After standing for 7 days at room temperature, the bottle was opened, the precipitate of triethylamine hydrochloride filtered off, and the solvent removed to yield 2',4'-bis(2,2-diethylhydrazino)-3',5'-dinitrobenzotrifluoride, a red oil.

EXAMPLE 3

Into 90 ml. tetrahydrofuran under a nitrogen atmosphere were dissolved 45 gms. 2,4-dichloro-3,5-dinitrobenzotrifluoride. The solution was cooled to −20°C. A solution of 1.6 gms. of triethylamine and 1.4 gms. 1,1-diethylhydrazine in 20 ml. tetrahydrofuran was added slowly, so that the temperature did not rise above −10°C. While continuing to maintain the nitrogen atmosphere, the bottle containing the reactants was capped tightly and allowed to rise to ambient temperature during a period of 4 hrs. After several days, the bottle was opened, the triethylamine hydrochloride precipitate filtered out, and the reaction mixture cooled to −17°C under a nitrogen atmosphere. A solution of 1.6 gms. triethylamine and 1.0 gms. of N,O-dimethylhydroxylamine in 15 ml. tetrahydrofuran was then added slowly, so that the temperature rose to −15°C. While still maintaining the nitrogen atmosphere, the bottle containing the reactants was capped tightly and allowed to stand several days at ambient temperature. The precipitate of triethylamine hydrochloride was filtered out and the solvent removed to yield 2-(3-(N-methoxy-N-methylamino)-2,6-dinitro-4-trifluoromethylphenyl)-1,1-diethylhydrazine, a red oil.

EXAMPLES 4 – 22

The following were prepared by the methods of Examples 1 – 3.

4. 2-(3'-amino-2',6'-dinitro-4'-trifluoromethylphenyl)-1,1-pentamethylenehydrazine 5. 2-(3'-amino-2',6'-dinitro-4'-trifluoromethylphenyl)-1,1-diallylhydrazine 6. 2-(3'-amino-2',6'-dinitro-4'-trifluoromethyl)-1-methyl-1-propylhydrazine 7. 2-(3'-amino-2',6'-dinitro-4'-trifluoromethypheny)-1,1,2-trimethylhydrazine 8. 2-(3'-methylamino-2',6'-dinitro-4'-trifluoromethylphenyl)-1,1-diethylhydrazine 9. 2-(3'-methylamino-2',6'-dinitro-4'-trifluoromethylphenyl)-1,1-dimethylhydrazine 10. 2-(3'-methylamino-2',6'-dinitro-4'-trifluoromethylphenyl)-1,1-diallylhydrazine 11. 2-(3'-methylamino-2',6'-dinitro-4'-trifluoromethylphenyl)-1,1,2-trimethylhydrazine 12. 2-(3'-dimethylamino-2',6'-dinitro-4'-trifluoromethylphenyl)-1,1-diethylhydrazine 13. 2-(3'-dimethylamino-2',6'-dinitro-4'-trifluoromethylphenyl)-1,1-dimethylhydrazine 14. 2-(3'-dimethylamino-2',6'-dinitro-4'-trifluoromethylphenyl)-1,1-diallylhydrazine 15. 2-(3'-propylamino-2',6'-dinitro-4'-trifluoromethylphenyl)-1,1-dimethylhydrazine
16. 2-(3'-amino-4'-chloro-2',6'-dinitrophenyl)-1,1-dimethylhydrazine
17. 2-(3'-amino-4'-chloro-2',6'-dinitrophenyl)-1,1-hexamethylenehydrazine
18. 2-(3'-amino-4'-chloro-2',6'-dinitrophenyl)-1,1-diallylhydrazine
19. 2',4'-bis(2,2-dimethylhydrazino)-3,5-dinitrobenzotrifluoride
20. 2',4'-bis(2,2-dimethylhydrazino)-3,5-dinitrochlorobenzene
21. 2',4'-bis(2,2-diethylhydrazino)-3,5-dinitrochlorobenzene
22. 2-(3-methoxyamino-2,6-dinitro-4-chlorophenyl)-1,1-dimethylhydrazine

EXAMPLE 23

The compound of Example 1, i.e., 2-(3-amino-2,6-dinitro 4-trifluoromethylphenyl)-1,1-diethylhydrazine, nitralin and trifluralin were applied pre-emergent to several species at one lb. per acre and stand and growth ratings made 4 days later. These data were obtained.

| Cmpd of | Ex. 1 | | nitralin | | trifluralin | | check | |
|---|---|---|---|---|---|---|---|---|
| | stand | growth | stand | growth | stand | growth | stand | growth |
| ryegrass | 0 | 0 | 10 | 10 | 0 | 0 | 100 | 100 |
| corn | 90 | 30 | 100 | 60 | 100 | 30 | 100 | 100 |
| sunflower | 100 | 80 | 100 | 20 | 100 | 60 | 100 | 100 |
| tomato | 90 | 10 | 100 | 50 | 100 | 30 | 100 | 100 |
| mustard | 80 | 30 | 100 | 50 | 100 | 40 | 100 | 100 |

EXAMPLE 24

The compound of Example 1 and N-sec-butyl-4-tert-butyl-1,6-dinitroaniline were each applied to 18 tobacco plants one day after removal of the inflorescences, each plant receiving 50 ml. containing 1,500 ppm active ingredient in 50% aqueous acetone. Three weeks later the suckers were counted and the results were:

| | No. suckers/18 plants |
|---|---|
| Check | 116 |
| N-sec-butyl-4-tert-butyl-2,6-dinitroaniline | 13 |
| Compound of Example 1 | 1 |

EXAMPLE 25

The procedure of Example 1 is followed exactly replacing the benzotrifluoride with 2',4'-dichloro-3',5',-dinitrobenzoic acid. A red gummy solid, 2-amino-3',5'-dinitro-4'-(2,2-diethylhydrazino)benzoic acid, melting at 81°–92°C, is produced. This is treated with sulfur tetrafluoride and hydrogen fluoride in the absence of oxygen at ambient temperature in a reactor to yield 2-(3'-amino-2',6'-dinitro-4-trifluoromethylphenyl)-1,1-diethylhydrazine, m.p. 102°–105°C after recrystallization from ethyl ether and ligroine.

EXAMPLE 26

2-(3-amino-2,6-dinitro-4-trifluoromethylphenyl)-1,1-dimethylhydrazine is prepared by the method of Example 1 by substituting 1,1-dimethylhydrazine for 1,1-diethylhydrazine.

EXAMPLE 27

2-(3-amino-4-chloro-2,6-dinitrophenyl)-1,1-diethylhydrazine is prepared by the method of Example 1 by substituting 1,2,4,-trichloro-3,5-dinitrobenzene for the benzotrifluoride.

EXAMPLES 28 – 30

The following were prepared by the method of Examples 1 – 3:
28. 2-(3'-amino-4'-cyano-2',6'-dinitrophenyl)-1,1-diethylhydrazine
29. 2-(3'-amino-4'-carbamyl-2',6'-dinitrophenyl)-1,1-diethylhydrazine
30. 2-(3'-amino-4'-methoxycarbonyl-2',6'-dinitrophenyl)-1,1-diethylhydrazine

I claim:
1. A compound of the formula

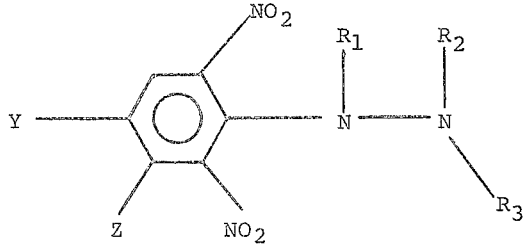

wherein Y is halogen or trifluoromethyl; Z is amino or mono or di-lower alkylamino; $R_1$ is H, lower alkyl or lower alkenyl; and $R_2$ and $R_3$ are independently H, lower alkyl, or lower alkenyl.

2. A compound of claim 1, wherein Y is chloro or trifluoromethyl; Z is amino or amino substituted with $C_1$-$C_4$ alkyl; $R_1$ is H or $C_1$-$C_4$ alkyl; and $R_2$ and $R_3$ are independently H, or $C_1$-$C_3$ alkyl.

3. A compound of claim 1 wherein Y is chloro or trifluoromethyl; Z is amino; $R_1$ is H; and $R_2$ and $R_3$ are independently $C_1$-$C_3$ alkyl.

4. A compound of claim 1 which is 2-(3-amino-2,6-dinitro-4-trifluoromethylphenyl)-1,1-dimethylhydrazine.

5. A compound of claim 1 which is 2-(3-amino-2,6-dinitro-4-trifluoromethylphenyl)-1,1-diethylhydrazine.

6. A compound of claim 1 which is 2-(3-amino-4-chloro-2,6-dinitrophenyl)-1,1-diethylhydrazine.

7. A compound of claim 1 which is 2-(3-amino-4-trifluoromethyl-2,6-dinitrophenyl)-1,1,2-trimethylhydrazine.

8. A compound of claim 1 which is 2-(3-methylamino-4-trifluoromethyl-2,6-dinitrophenyl)-1,1-diethylhydrazine.

9. A compound of claim 1 which is 2-(3-dimethylamino-2,6-dinitro-4-trifluoromethylphenyl)-1,1-dimethylhydrazine.

10. A compound of claim 1 which is 2-(3-propylamino-2,6-dinitro-4-trifluoromethylphenyl)-1,1-dimethylhydrazine.

* * * * *